United States Patent [19]

Howe

[11] Patent Number: 5,334,256
[45] Date of Patent: Aug. 2, 1994

[54] PAINT STRIPPING COMPOSITION

[76] Inventor: Charles R. Howe, 108 Mahogany Dr., Northeast, Md. 21901

[21] Appl. No.: 70,280

[22] Filed: Jun. 2, 1993

[51] Int. Cl.$^5$ .......................... B08B 3/08; C09D 9/00; C11D 7/26; C11D 7/50
[52] U.S. Cl. ...................... 134/38; 252/162; 252/170; 252/364; 252/DIG. 8
[58] Field of Search ................ 252/162, 170, DIG. 8, 252/364; 134/38

[56] References Cited

U.S. PATENT DOCUMENTS

| | | | |
|---|---|---|---|
| 1,499,101 | 6/1924 | Ellis | 252/165 |
| 2,705,207 | 3/1955 | Stevens | 134/26 |
| 3,410,805 | 11/1968 | Goldsmith et al. | 252/158 |
| 3,463,735 | 8/1969 | Stonebraker | 252/137 |
| 3,607,760 | 9/1971 | McIntyre | 252/170 |
| 3,839,234 | 10/1974 | Roscoe | 252/544 |
| 3,886,099 | 5/1975 | Hall | 252/548 |
| 4,435,305 | 3/1984 | Tsoukalas et al. | 252/158 |
| 4,592,787 | 6/1986 | Johnson | 252/171 |
| 4,940,493 | 7/1990 | Neidiffer et al. | 134/3 |
| 4,973,420 | 11/1990 | Van De Mark | 252/170 |
| 5,049,314 | 9/1991 | Short | 252/542 |
| 5,124,062 | 6/1992 | Stevens | 252/162 |

FOREIGN PATENT DOCUMENTS

| | | |
|---|---|---|
| 4130494 | 4/1993 | Fed. Rep. of Germany . |
| 62-054797 | 3/1987 | Japan ................................. 252/170 |
| 3277697 | 12/1991 | Japan . |
| 1311534 | 3/1973 | United Kingdom . |
| 1426857 | 3/1976 | United Kingdom . |

*Primary Examiner*—Linda Skaling
*Attorney, Agent, or Firm*—Richard C. Litman

[57] ABSTRACT

A paint stripping composition comprising a mixture of the monobutyl ether of ethylene glycol and isopropanol and a method of using the same is disclosed. This combination of components allows for the removal of paint from various substrates and is particularly effective in removing paint from a plastic surface, such as those that make up scale models, without degrading or weakening the plastic.

6 Claims, No Drawings

PAINT STRIPPING COMPOSITION

BACKGROUND OF THE INVENTION

1. Field of the Invention

The present invention relates to paint removers and strippers. More specifically, it relates to a composition and method for removing paint from a substrate. Even more specifically, it relates to a method and composition for removing paint or the like from various substrates, wherein the composition consists of a mixture of isopropyl alcohol and ethylene glycol monobutyl ether.

2. Description of the Prior Art

Miniature models of various real world articles are popular pastimes both for the satisfaction that comes from assembling them and from the display and, in some cases, the motorized animation of the finished products. Hobbyists can become very detail oriented in the decoration of the objects, poring through old publications to deduce, for instance, the exact paint scheme of various historical vehicles. One of the most popular versions of this pastime with people of all ages is the assembly and display of model railroads. There are various standard scales used by the industry but in recent times the most common material used in the manufacture of railroad models and other types of such objects is a synthetic plastic material. This material produces durable plastic articles which are inexpensive to manufacture and shape. One of the most challenging aspects of the assembly process is the painting of the object. Because of the small size of the pieces involved and the fineness of the brushes used, mistakes can be made which, if not immediately caught, can be difficult to correct. Paint removers that are commonly available on the open market are not suitable in this usage because they would mar or fatally weaken the plastic while removing the decorative paint or enamel. Paint removers have been the subject of various patents.

In U.S. Pat. No. 1,499,101 issued on Jun. 24, 1924 to Carleton Ellis there is disclosed a paint and varnish remover having a high flashpoint and low degree of inflammability. The remover is basically made up of a mixture of trichlorethylene, ethyl acetate, monochlorbenzol, and hard paraffin wax.

Another patent of interest is U.S. Pat. No. 2,705,207 issued on Mar. 29, 1955 to Ralph E. Stevens. In this patent, a two stage method for removing paint and varnish is disclosed. In the first stage, a coating that includes a halogen containing alkane is applied. After this has dried, a second coating is applied that contains a normally liquid hydrocarbon, an alcohol, an ester of an aliphatic carboxylic acid, and an alcohol whose ester contains 3 to 5 carbon atoms, and then stripping the resulting film from the substrate.

Next is U.S. Pat. No. 3,410,805 issued on Nov. 12, 1968 to Henry A. Goldsmith et al. This patent described a paint stripping composition wherein an N-substituted sulfonamide and a glycol additive are used to improve the paint removing efficiency of an alkali metal hydroxide solution.

The U.K. Patent specification published on Mar. 3, 1976 for Robert H. Shoemaker et al. relates to an alkali metal hydroxide paint stripping compositions and method.

In U.S. Pat. No. 4,973,420 issued on Nov. 27, 1990 to Micheal R. Van De Mark there is disclosed a stripper composition for the removal of protective coatings. The composition includes trioxane and an aromatic hydrocarbon and an aliphatic alcohol can be added to improve the solubility parameters.

Lastly, U.S. Pat. No. 5,049,314 issued on Sept. 17, 1991 to Sidney M. Short discloses a paint stripping composition that consists of a five membered ring lactone and an oxygenated aliphatic solvent.

None of the above inventions and patents, taken either singly or in combination, is seen to describe the instant invention as claimed.

SUMMARY OF THE INVENTION

The present invention pertains to a paint stripping composition comprising a mixture of the monobutyl ether of ethylene glycol and isopropanol and a method of using the same. This combination of components allows for the removal of paint from various substrates and is particularly effective in removing paint from a plastic surface, such as those that make up scale models without degrading or weakening the plastic.

Accordingly, it is a principal object of the invention to provide a stripping composition that allows the user to easily and safely remove the paint from various surfaces.

It is another object of the invention to provide a stripping composition that allows the paint to be stripped from a plastic substrate without marring or structurally weakening the plastic being treated.

It is a further object of the invention to provide a stripping composition where the residue of paint and the stripper itself can be easily rinsed off with water.

These and other objects of the present invention will become more readily apparent upon further review of the following detailed description.

DETAILED DESCRIPTION OF THE PREFERRED EMBODIMENTS

The present invention provides a composition consisting essentially of a mixture of the monobutyl ether of ethylene glycol and isopropyl alcohol. The present mixture contains about 30% to 70% by weight of ethylene glycol monobutyl ether and about 70% to 30% by weight of isopropyl alcohol. The preferred ratio of ethylene glycol monobutyl ether to isopropanol for use on a painted plastic substrate is 60% to 40%. This mixture allows for efficient stripping of paint from a plastic substrate. The preferred mixture of the monobutyl ether of ethylene glycol and isopropyl alcohol provides for a somewhat viscous liquid. This allows for either immersion of the piece in question or a brush or spray application. It should be noted that though plastic is discussed as the principal substrate in this specification, this composition will remove paint from other various substrates such as metal in the same manner as herein described.

Various tests of the compositions of the present invention have been conducted, and the results are reported below. Herein all ratios of components are set forth as percentages by weight unless stated otherwise.

In the preferred mixture of approximately 60% ethylene glycol monobutyl ether and 40% isopropyl alcohol, a piece of plastic of the standard type found in modeling kits was painted with an enamel paint and was allowed to dry. The painted plastic piece was then completely immersed in the mixture and was allowed to remain submerged in the composition for five minutes. When the piece was taken from the present liquid composition, the paint could be readily removed from the plastic substrate by a light rubbing motion with a cloth or by hand, and was easily and completely removed from the piece by rinsing in running water. No structural degradation or weakening of the plastic substrate was noted and the molded surface details of the stripped plastic piece were not blurred or distorted in any way.

When a composition containing 50% ethylene glycol monobutyl ether and 50% isopropanol was tested in the same manner over the same time period, weakening of the plastic substrate was observed and the piece was noticeably more flexible than before immersion.

In another test, a mixture having a proportion of 30% ethylene glycol monobutyl ether to 70% isopropyl alcohol was employed. While there was no substrate degradation noted in this particular test, the immersion time had to be extended to one hour before the paint could be removed.

Reversing the previous proportion of the mixture to 70% ethylene glycol monobutyl ether and 30% isopropanol, substrate degradation was apparent and the immersion time needed for removal of the paint was 16 minutes.

In another test, 12 plastic models were obtained. The first was covered with a coat of spray enamel. The second was covered with two coats of spray enamel and so on, so that the twelfth model has 12 coats of the enamel applied to it. All the models were completely dry. At this point all twelve of the models were completely immersed in the 60% ethylene glycol monobutyl ether and 40% isopropyl alcohol mixture for a five minute period. Afterwards, the paint was easily and completely removed from all of the models.

It has been noticed additionally that a mild temperature elevation, such as would be obtained by immersing a pan containing the stripper composition in a hot tap water bath, accelerates the removal of the paint.

As mentioned above, the composition is soluble in water, which makes the actual removal of the paint from the substrate simple. If a mistake is made during application of the stripper composition, quickly rinsing the piece, or the portion of the piece affected, in running water will prevent the stripper from acting on the area. If deep crevasses or the like were to be encountered in the workpiece, a small brush, similar to a toothbrush, could be used to remove paint therefrom.

It should be emphasized that though synthetic plastics make up the substrates discussed above, the stripper herein described will work equally well on metal, ceramic, stone, or similar materials. Suitable synthetic plastics include polystyrene, methacrylates, or polyethylene, for example, that can be used to produce durable finished articles.

Additionally, applicant has tested various dilutions of the mixture and has found that a 50% dilution, for example, works very well as a cleaner for engine parts or similar items. Even weaker dilutions, it has been noted, can act as a cleaner for other various soiled surfaces.

It is to be understood that the present invention is not limited to the sole embodiment described above, but encompasses any and all embodiments within the scope of the following claims.

I claim:

1. A paint stripping composition consisting of:
   about 60% by weight of ethylene glycol monobutyl ether; and
   about 40% by weight of isopropyl alcohol.

2. A paint stripping composition consisting of:
   60% by weight of ethylene glycol monobutyl ether; and
   40% by weight of isopropyl alcohol.

3. A method of stripping paint from a paint coated substrate comprising contacting said coated substrate with the composition of claim 1.

4. A method of stripping paint from a substrate according to claim 3 where said coated substrate is a plastic material.

5. A method of stripping paint from a substrate according to claim 3 further including the step of heating said composition.

6. A method of stripping paint from a substrate according to claim 3 further including the step of rinsing the substrate after contacting said coated substrate with said composition to facilitate removal of the paint.

* * * * *